US012257642B2

(12) United States Patent
Ashmore et al.

(10) Patent No.: US 12,257,642 B2
(45) Date of Patent: Mar. 25, 2025

(54) FABRICATION WITH REGULATED GRAIN FORMATION

(71) Applicant: THE BOEING COMPANY, Chicago, IL (US)

(72) Inventors: Nathan A. Ashmore, Glendale, MO (US); Gary W. Coleman, Snohomish, WA (US); David Griffiths, Cambridge (GB); Michelangelo Mortello, Cambridge (GB); Robert James Scudamore, Sheffield (GB); Lei Xu, Cambridge (GB)

(73) Assignee: THE BOEING COMPANY, Arlington, VA (US)

( * ) Notice: Subject to any disclaimer, the term of this patent is extended or adjusted under 35 U.S.C. 154(b) by 965 days.

(21) Appl. No.: 16/878,751

(22) Filed: May 20, 2020

(65) Prior Publication Data

US 2021/0362264 A1  Nov. 25, 2021

(51) Int. Cl.
*B23K 10/02* (2006.01)
*B23K 26/00* (2014.01)
*B23K 26/08* (2014.01)
*B23K 26/082* (2014.01)
*B23K 35/32* (2006.01)
(Continued)

(52) U.S. Cl.
CPC ........ *B23K 10/027* (2013.01); *B23K 26/0006* (2013.01); *B23K 26/082* (2015.10); *B23K 26/0869* (2013.01); *B23K 35/325* (2013.01); *B23K 37/0211* (2013.01); *B33Y 10/00* (2014.12); *B33Y 30/00* (2014.12);
(Continued)

(58) Field of Classification Search
CPC ............... B23K 10/006; B23K 10/027; B23K 26/0006; B23K 26/082; B23K 26/0869; B23K 26/325; B23K 26/354; B23K 37/0211; B23K 2103/14; B23K 35/325; B33Y 10/00; B33Y 30/00; B33Y 70/00; B33Y 80/00; C21D 9/50; C21D 9/505; Y02P 10/25; B22F 10/25; B22F 10/364; B22F 10/80; B22F 12/10; B22F 12/224; B22F 12/41; B22F 12/43; B22F 2999/00
USPC ....................................................... 219/76.1
See application file for complete search history.

(56) References Cited

U.S. PATENT DOCUMENTS 9,751,260 B2      9/2017  Dietrich et al.
2007/0122560 A1*  5/2007  Adams ...................... C23C 4/02
                                                                  427/523
(Continued)

OTHER PUBLICATIONS

Titanium alloy—Ti6Al4V, 2023, Pollen AM, <https://www.pollen.am/metal_titanium/> (Year: 2023).*
(Continued)

*Primary Examiner* — Dana Ross
*Assistant Examiner* — Joseph W Iskra
(74) *Attorney, Agent, or Firm* — Moore IP Law

(57) ABSTRACT

A method of fabricating of an object includes causing a first heat source to heat a feed material to form a melt pool of the feed material on a surface. The method further includes causing a second heat source to heat the melt pool on the surface to regulate grain formation of the feed material in the melt pool as the melt pool cools and solidifies on the surface to form at least a portion of the object. The method also includes causing the first heat source and the second heat source to move relative to the surface as the melt pool is formed and cooled.

20 Claims, 7 Drawing Sheets

(51) Int. Cl.
  *B23K 37/02* (2006.01)
  *B23K 103/14* (2006.01)
  *B33Y 10/00* (2015.01)
  *B33Y 30/00* (2015.01)
  *B33Y 70/00* (2020.01)
  *B33Y 80/00* (2015.01)

(52) U.S. Cl.
  CPC ............... *B33Y 70/00* (2014.12); *B33Y 80/00* (2014.12); *B23K 2103/14* (2018.08)

(56) References Cited

U.S. PATENT DOCUMENTS

| | | | | |
|---|---|---|---|---|
| 2013/0136868 | A1* | 5/2013 | Bruck | B23K 26/342 427/532 |
| 2015/0064047 | A1* | 3/2015 | Hyde | B22F 3/1028 164/113 |
| 2016/0016259 | A1* | 1/2016 | Bruck | B23K 26/0608 219/121.64 |
| 2016/0318130 | A1* | 11/2016 | Stempfer | B33Y 10/00 |

OTHER PUBLICATIONS

Fan, Y. et al., "Relationships among the Microstructure, Mechanical Properties, and Fatgue Behavior in thin Ti6l4V," Advances in Materials Science and Engineering, Hindawi Publishing Corporation, vol. 2016, Article D7278267, pp. 1-9.

Fu, Jie et al., "Microstructure and Mechanical Properties of Ti—6Al—4V Fabricated by Vertical Wire Feeding with Axisymmetric Multi-Laser Source," Applied Sciences, 2017, vol. 7, No. 227, 11 pgs.

Ho, Alistair et al., "On the origin of microstructural banding in Ti—6Al4V wire-arc based high deposition rate additive manufacturing," Acta Materialia vol. 116, 2019, pp. 306-323.

* cited by examiner

FABRICATION WITH REGULATED GRAIN FORMATION

FIELD OF THE DISCLOSURE

The present disclosure is generally related to a fabrication with controlled grain formation, and more particularly to fabrication processes and systems for performing the fabrication processes, and articles of manufacture formed thereby.

BACKGROUND

Additive manufacturing has been used for some materials, such as polymers, to rapidly prototype parts. As additive manufacturing technologies have improved, they have begun to move from a so called "rapid prototyping" role into a full-fledged manufacturing role. However, it can be challenging to use additive manufacturing to generate usable parts in certain contexts. For example, additively manufactured parts tend to have anisotropic mechanical properties due to the typical layer-by-layer manufacturing process. As a result, such parts may not be suitable for use in systems that require uniformity and high-reliability, such as many aircraft, industrial parts, or life-safety systems.

SUMMARY

In a particular implementation, a system for fabrication of an object includes a first heat source to heat a feed material to form a melt pool of the feed material on a surface. The system also includes a second heat source to heat the melt pool on the surface to regulate grain formation of the feed material in the melt pool as the melt pool cools and solidifies on the surface to form at least a portion of the object. The system further includes a movement system to move the surface relative to the first and second heat sources as the melt pool is formed and cooled.

In another particular implementation, a method of fabricating of an object includes causing a first heat source to heat a feed material to form a melt pool of the feed material on a surface. The method further includes causing a second heat source to heat the melt pool on the surface to regulate grain formation of the feed material in the melt pool as the melt pool cools and solidifies on the surface to form at least a portion of the object. The method also includes causing the first heat source and the second heat source to move relative to the surface as the melt pool is formed and cooled.

In another particular implementation, an article of manufacture includes a first layer of a titanium α-β alloy and a second layer of the titanium α-β alloy. Grain boundaries of the first layer do not align with grain boundaries of the second layer.

The features, functions, and advantages described herein can be achieved independently in various implementations or may be combined in yet other implementations, further details of which can be found with reference to the following description and drawings.

DETAILED DESCRIPTION

Aspects disclosed herein present systems for additive manufacturing using multiple heat sources to regulate grain formation to provide improved mechanical properties. Methods of manufacturing and articles manufactured using the disclosed methods are also disclosed.

The figures and the following description illustrate specific examples. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific examples described below, but by the claims and their equivalents.

Figure 1:
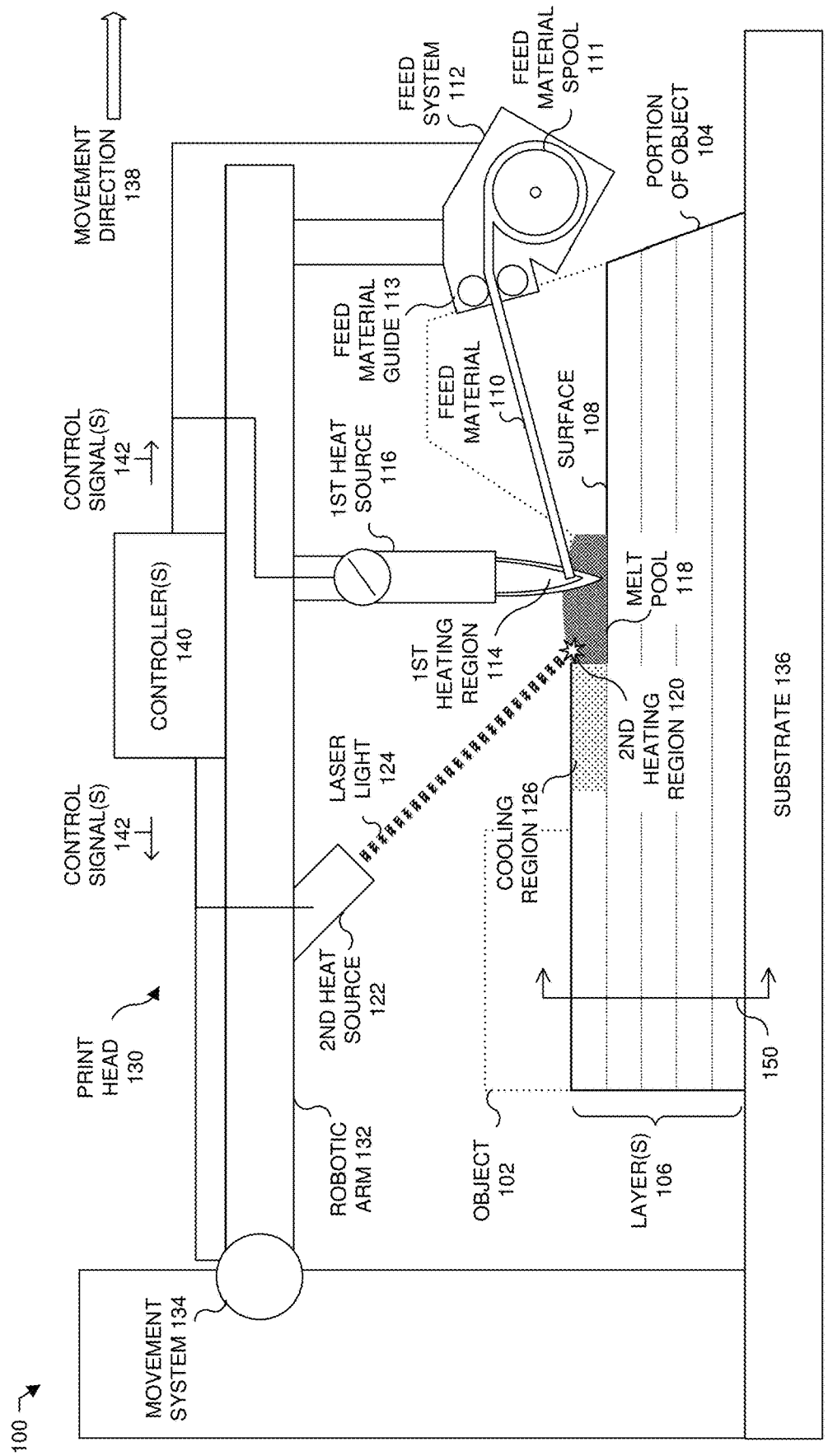
FIG. 1 is a diagram that illustrates an example of a system for fabrication of an object.

Particular implementations are described herein with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts a system 100 including one or more controllers ("controller(s) 140 in FIG. 1), which indicates that in some implementations the system 100 includes a single controller 140 and in other implementations the system 100 includes multiple controllers 140. For ease of reference herein, such features are generally introduced as "one or more" features and are subsequently referred to in the singular unless aspects related to multiple of the features are being described.

The terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 is a diagram that illustrates an example of a system 100 for fabrication of an object 102. In the example illustrated in FIG. 1, a portion 104 of the object 102 has been formed and includes a plurality of layers 106 and a remaining portion of the object 102 is yet to be formed and is shown in dotted lines. The particular shape and proportions of the object 102 illustrated in FIG. 1 are merely illustrative and are not limiting. Rather, the system 100 can be used to fabricate an object having any size, shape, and proportions that can be formed using additive manufacturing alone or in combination with other manufacturing processes (such as post-fabrication machining).

The system 100 includes multiple heat sources of different types. For example, in FIG. 1, the system 100 includes a first heat source 116 and a second heat source 122. The first heat source 116 is a primary heat source used to generate a melt pool 118 of a feed material 110. In a particular example, the first heat source 116 is of a type selected to rapidly melt the feed material 110. The second heat source 122 is used as a secondary heat source to regulate the cooling rate of the melt pool 118 to control or regulate grain formation in as the melt pool 118 cools and solidifies. In a particular example, the second heat source 122 is of a type selected for fine heating control and directionality. As an example, the first heat source 116 includes a plasma torch that generates a plasma defining a first heating region 114 that melt the feed material 110 relatively quickly to form the melt pool 118. In this example, the second heat source 122 includes a laser source that directs laser light 124 toward the melt pool 118 to define a second heating region 120. In the particular implementation illustrated in FIG. 1, the laser light 124 is pulsed or otherwise controlled to regulate the cooling rate of the melt pool 118 in order to control or regulate grain formation as the feed material 110 of the melt pool 118 cools and solidifies. Alternatively, or in addition, the pulsed laser light 124 can regulate grain formation in other ways, such as by agitating the melt pool 118. Although the system 100 includes a single primary heat source (e.g., the first heat source 116) and a single secondary heat source (e.g., the second heat source 122) in the implementation illustrated in FIG. 1, in other implementations, the system 100 includes more than one primary heat source, more than one secondary heat source, or both.

The system 100 also includes a movement system 134 that is configured to move the heat sources 116, 122 relative to a surface 108 on which the melt pool 118 is formed. In FIG. 1, the surface 108 is an upper surface of a top layer 106 of the portion 104 of the object 102 that has already been formed; however, in other circumstances, the surface 108 includes or corresponds to a surface of a substrate 136 on which the object 102 is to be formed. In some implementations, the substrate 136 is stationary and the movement system 134 moves the heat sources 116, 122. For example, the heat sources 116, 122 can be coupled to one or more print heads 130 that are moveable relative to the substrate 136. To illustrate, the print head 130 in FIG. 1 is coupled to a robotic arm 132 that includes or is coupled to the movement system 134 and the heat sources 116, 122. In other implementations, the movement system 134 includes or corresponds to a gantry system that enables movement of the heat sources 116, 122. In other implementations, the movement system 134 is coupled to the substrate 136 to move the substrate 136 relative to the heat sources 116, 122. For example, the movement system 134 can include a multi-axis table (e.g., an X-Y table, or an X-Y-Z table) that is moveable along multiple axes relative to the heat sources 116, 122. In still other implementations, the movement system 134 enables movement of both the heat sources 116, 122 and the substrate 136.

In FIG. 1, the system 100 includes a feed system 112. The feed system 112 is configured to supply the feed material 110 to a heating region (e.g., first heating region 114) associated with the first heat source 116. For example, the feed system 112 includes one or more motors, one or more rollers, one or more feed material guides 113, one or more feed material spools 111, one or more sensors (e.g., speed or position sensors), other components, or a combination thereof. In the particular example illustrated in FIG. 1, the feed system 112 is coupled to the movement system 134 and moves with the heat sources 116, 122. In other examples, one or more components of the feed system 112 are coupled to the movement system 134 to move with the heat sources 116, 122 and one or more other components of the feed system 112 are stationary. To illustrate, the feed material spool 111 is stationary, and the feed material 110 is feed from the feed material spool 111 to a feed material guide 113 that moves with the heat sources 116, 122.

The feed material 110 is a wire or rod that comprises a metal or metal alloy (e.g., a metal wire alloy). In a particular implementation, the feed material 110 includes titanium. For example, the feed material 110 can include a titanium α-β alloy. As used herein, a titanium α-β alloy is alloy of titanium with one or more other materials that promote or allow formation of hexagonal (α)-phase crystals and body-centered cubic (β)-phase crystals. Examples of α-phase promoting materials include aluminum and tin. Examples of β-phase promoting materials include molybdenum, vanadium, niobium, tantalum, zirconium, manganese, iron, chromium, cobalt, nickel, and copper. A specific example of titanium α-β alloy is Ti-6Al-4V, which is an alloy of titanium (Ti), aluminum (Al), vanadium (V), and often traces of other materials, such as iron, oxygen, carbon, nitrogen, hydrogen, yttrium, etc.

The system 100 also includes or is coupled to a controller 140. The controller 140 includes an application-specific integrated circuit (ASIC), a field-programmable gate array (FPGA), a processor that executes instructions from a memory device, or a combination thereof. The controller 140 is coupled to the first heat source 116, the second heat source 122, the feed system 112, the movement system 134, or a combination thereof. The controller 140 provides control signals 142 to one or more components of the system 100 to control formation of the object 102. For example, the controller 140 receives three-dimensional (3D) model data representing the object 102 or machine instructions (e.g., G-code) related to manufacturing the object 102 and controls the components of the system 100 based on the three-dimensional (3D) model data or machine instructions to form the object 102. As another example, the controller 140 controls operation of the second heat source 122, the movement system 134, or both, to limit formation of grains that extend across multiple layers 106 of the object 102. To illustrate, the controller 140 can control power output of the second heat source 122, a size or location of the second heating region 120, a pulse rate of the laser light 124, or a combination thereof, to regulate grain formation as the melt pool 118 cools. As a specific example, a temperature of the melt pool 118 in the second heating region 120 (and a resulting temperature in the cooling region 126) is controlled by controlling the second heat source 122. Experiments discussed with reference to FIGS. 2A and 2B indicate that controlling the temperature of the melt pool 118 in this manner can limit growth of grains that extend between adjacent layers 106), can facilitate growth of equiaxed grains, or both, which improves isotropy of the mechanical properties of the object 102.

During a particular example of operation of the system 100, the controller 140 receives a 3D model of the object 102 and processes the 3D model to generate slices representing the layers 106. Alternative, another device (e.g., a design computer executing slicing software) provides the 3D model to the controller 140 as data representing the layers 106 or as machine instructions. The controller 140 generates the control signals 142 to control operation of the system 100 to form the object based on the 3D model, the slices, or the machine instructions.

The feed system 112 advances the feed material 110 toward the first heating region 114 of the first heat source 116, and a portion of the feed material 110 is melted to form the melt pool 118 on the surface 108. The movement system 134 moves the substrate 136, the heat sources 116, 122, or both, such that the melt pool 118 advances in a movement direction 138 along the surface 108 to form one of the layers 106. Additionally, the second heat source 122 directs energy toward the melt pool 118 to form the second heating region 120. The second heating region 120 is controlled to encourage formation of equiaxed grains (e.g., to limit formation of grains that extend between multiple layers 106). These operations continue and/or are repeated until all of the layers 106 of the object 102 have been deposited. Subsequently, the object 102 can undergo post-processing to refine the shape, surface texture, or grain characteristics of the object 102.

Although the first heat source 116 is described above as a plasma torch, in other implementations, the first heat source 116 can include another heat source appropriate to a particular feed material 110, such as an oxy-acetylene torch or another heat source such as a laser or electron beam, capable of rapidly melting the particular feed material 110 to form the melt pool 118. Additionally, although the second heat source 122 is described above as a laser, in other implementations, the second heat source 122 can include another heat source appropriate to the particular feed material 110, such as an electron beam source or another heat source capable of regulating grain formation in the cooling region 126 as the melt pool 118 of the particular feed material 110 cools and solidifies.

Thus, the second heat source 122 regulates grain formation as the object 102 is formed such that the object 102 has improved mechanical properties relative to an object formed without regulating grain formation. For example, the object 102 has multiple substantially equiaxed layers in which grains do not extend between layers, grain boundaries are not aligned between layers, or both. The substantially equiaxed layers provide more isotropic mechanical properties, as compared columnar layers in which many grains extend between multiple of the layers 106.

Figure 2B:
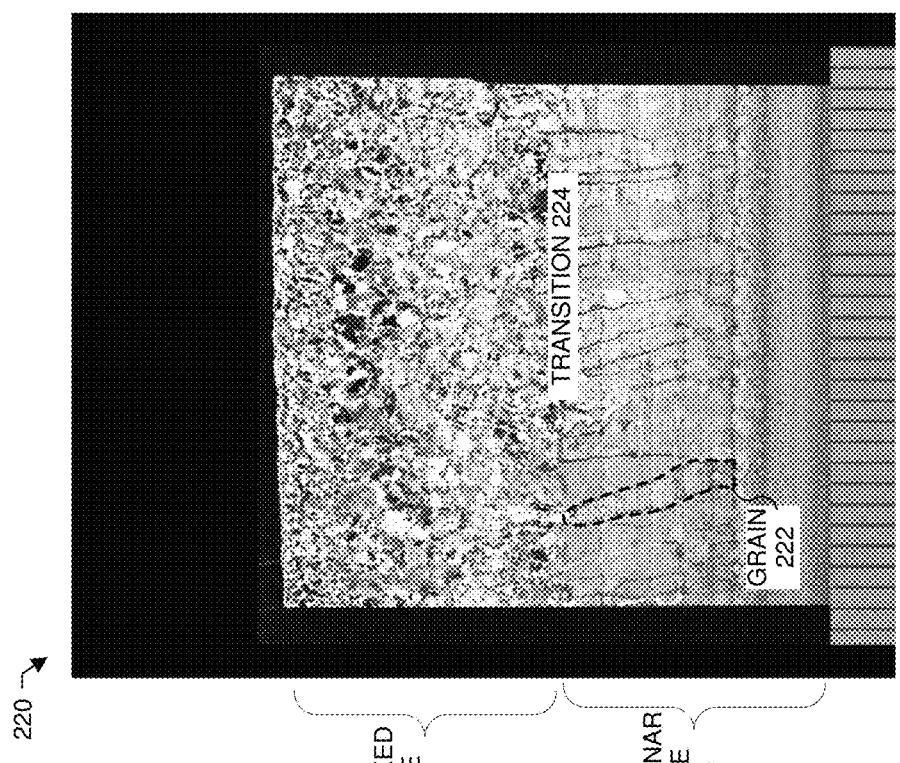
FIG. 2B is an image depicting a cross-sectional view of an example of an object fabricated while controlling grain formation according to a particular implementation.
Figure 2A:
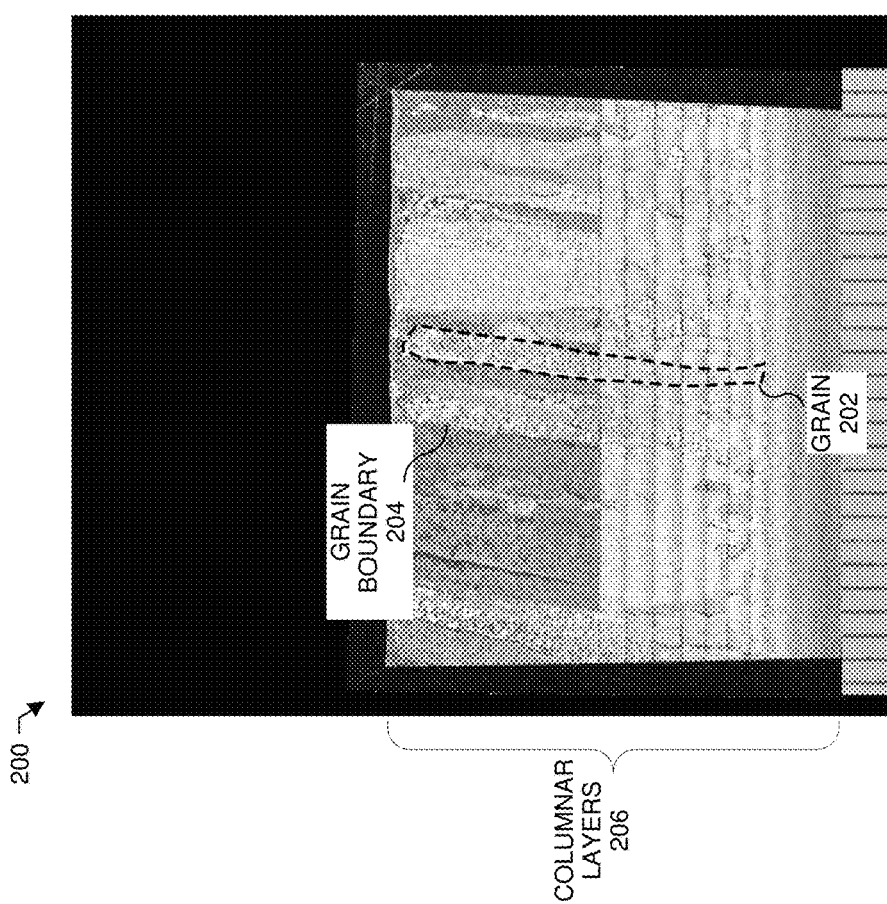
FIG. 2A is an image depicting a cross-sectional view of an example of an object fabricated without controlling grain formation.

FIG. 2A is an image (e.g., a micrograph) depicting a cross-sectional view 200 of an example of an object fabricated without controlling grain formation. To illustrate, the cross-sectional view 200 of FIG. 2A is an example of a cross-section of the object 102 along line 150 of FIG. 1 when the second heat source 122 is not used to regulate grain formation. In contrast, FIG. 2B is an image (e.g., a micrograph) depicting a cross-sectional view 220 of an example of an object fabricated while controlling grain formation according to a particular implementation. To illustrate, the cross-sectional view 220 of FIG. 2B is an example of a cross-section of the object 102 along the line 150 of FIG. 1 when the second heat source 122 is used to regulate grain formation.

The objects depicted in FIGS. 2A and 2B were both formed using a system similar to the system 100 of FIG. 1 except that the second heat source 122 was not used during formation of the object depicted in FIG. 2A. To generate the objects, the first heat source 116 was a plasma torch using argon as a shielding gas and plasma gas. The feed material 110 was 1.14 mm diameter solid VBC ALLOY 0073 wire (VBC ALLOY 0073 is a Ti-6Al-4V alloy available from VBC Group of Loughborough, Leicestershire, United Kingdom). The plasma torch had the properties and operational characteristics described in Table 1:

TABLE 1

| Parameter | Value |
| --- | --- |
| Nozzle (orifice) diameter (mm) | 3.0 |
| Electrode diameter (mm) | 4.0 |
| Electrode set back (mm) | 1.4 |
| Plasma gas flow rate (liters/minute) | 1.0 |
| Travel speed (meters/minute) | 0.12 |
| Feed material feed rate (meters/minute) | 1.5 |
| Peak current (amperes) | 135 |
| Peak current time (s) | 0.1 |
| Base current (amperes) | 60 |
| Base current time (seconds) | 0.05 |
| Pulsing frequency (Hz) | 7 |
| Voltage (volts) | 8-12 |

To generate the object depicted in FIG. 2B, the second heat source 122 was a pulsed laser source aimed such that the beam spot was coincident with the heating zone of the plasma torch (e.g., so that the second heating region 120 aligned with or overlapped the first heating region 114) with the properties and operational characteristics described in Table 2:

TABLE 2

| Parameter | Value |
| --- | --- |
| Beam parameter product (mm*mrad) | 7.5 |
| Fibre diameter (microns) | 200 |
| Focal length of focusing lens (mm) | 200 |
| Focal length of collimator (mm) | 150 |
| Beam spot diameter (mm) | 0.3 |
| Laser average power (kW) | 2 |
| Laser Pulse Frequency (Hz) | 2 |

In FIG. 2A, a particular grain 202 is outlined in dashed lines and a grain boundary 204 is identified in FIG. 2A. As shown in FIG. 2A, the particular grain 202 extends through several layers (columnar layers 206 in FIG. 2A) of the cross-sectional view 200. Additionally, the grain boundary 204 is aligned through several layers of the cross-sectional view 200. Thus, the object illustrated in FIG. 2A is expected to have relatively anisotropic mechanical properties.

In contrast, in the cross-sectional view 220, there is a clear transition 224 between columnar zone 226 and an equiaxed zone 228. In the columnar zone 226, one or more grains (e.g., grain 222) extend between two or more adjacent layers. However, grains of the equiaxed zone 228 do not extend between adjacent layers. Accordingly, at least the equiaxed zone 228 of the object depicted in FIG. 2B is expected to have substantially isotropic mechanical properties. If the presence of the columnar zone 226 is problematic for the particular object or use case, the columnar zone can be removed in post-processing such that the entire object formed has similar equiaxed properties.

Figure 3B:
FIG. 3B is an image depicting a more detailed cross-sectional view of another portion of the object depicted in FIG. 2B.
Figure 3A:
FIG. 3A is an image depicting a more detailed cross-sectional view of a portion of the object depicted in FIG. 2B of FIG. 2B.

FIG. 3A is an image depicting a more detailed cross-sectional view of a portion of the columnar zone 226 of FIG. 2B, and FIG. 3B is an image depicting a more detailed cross-sectional view 320 of a portion of the equiaxed zone 228 of FIG. 2B. As shown in FIG. 3A, the columnar zone 226 has predominately a basket weave-type α-phase microstructure. In contrast, as shown in FIG. 3B, the equiaxed zone 228 has predominately a colony α-phase microstructure.

Figure 4:
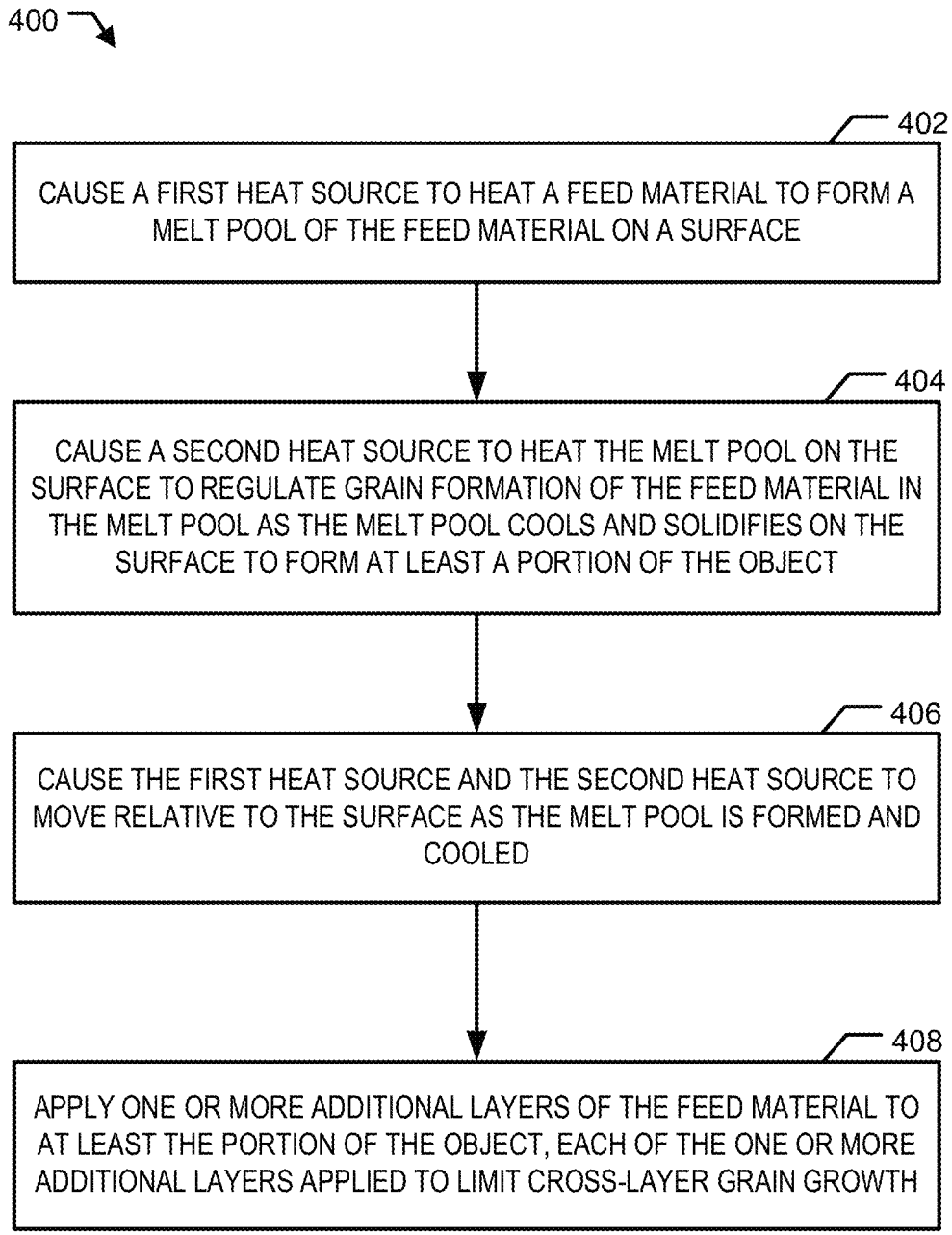
FIG. 4 is a diagram that illustrates a flow chart of an example of method of fabricating an object.

FIG. 4 is a diagram that illustrates a flow chart of an example of method 400 of fabricating an object. In a particular implementation, the method 400 includes operations initiated, performed, or controlled by the system 100 or one or more components thereof (such as the controller 140) during fabrication of the object 102.

The method 400 includes, at 402, causing a first heat source to heat a feed material to form a melt pool of the feed material on a surface. In some implementations, the first heat source includes a plasma torch and causing the first heat source to heat the feed material includes feeding a wire including the feed material into a heating region associated with the plasma torch. For example, in a particular implementation of the system 100 of FIG. 1, the first heat source 116 includes a plasma torch that melts the feed material 110 to form the melt pool 118 on the surface 108. In this particular implementation, the feed material 110 includes a wire, such as a metal alloy wire (e.g., a titanium alloy wire).

The method 400 includes, at 404, causing a second heat source to heat the melt pool on the surface to regulate grain formation of the feed material in the melt pool as the melt pool cools and solidifies on the surface to form at least a portion of the object. In some implementations, the second heat source includes a laser source and causing the second heat source to heat the melt pool includes directing a laser light toward a portion of the melt pool. In such implementations, the laser light can be pulsed to control grain formation of the feed material in the melt pool. Additionally, or in the alternative, the frequency of the laser light, the intensity of the laser light, or both, can be varied to control grain formation of the feed material in the melt pool. For example, in a particular implementation of the system 100 of FIG. 1, the second heat source 122 includes a pulsed laser source that directs the laser light 124 toward the melt pool 118.

The method 400 includes, at 406, causing the first heat source and the second heat source to move relative to the surface as the melt pool is formed and cooled. In some implementations, the surface is stationary and relative motion of the surface and the heat sources is due to movement of the heat sources. In other implementations, the heat sources are stationary and relative motion of the surface and the heat sources is due to movement of the surface. In still other implementations, both the surface and the heat sources move to generate the relative motion therebetween. For example, in FIG. 1, the system 100 includes the movement system 134 which is configured to move the heat sources 116, 122 relative to the surface 108 (and the substrate 136). To illustrate, one or both of the heat sources 116, 122 is coupled to the print head 130 on the robotic arm 132, and the movement system 134 moves the print head 130 via the robotic arm 132 to generate the relative motion.

The method 400 includes, at 408, after the melt pool solidifies, applying one or more additional layers of the feed material to at least the portion of the object, each of the one or more additional layers applied to limit cross-layer grain growth. For example, as illustrated in FIG. 1, the portion 104 of the object 102 that has already been formed includes multiple layers 106. The layers 106 include portions of the feed material 110 that were previously deposited by melting the feed material 110 to form a melt pool 118 and allowing the feed material 110 of the melt pool 118 to cool and solidify while controlling grain formation (using the second heat source 122) to limit cross-layer grain growth. To illustrate, a plurality of layers deposited using the method 400 include equiaxed grains, as illustrated in equiaxed zone 228 FIG. 2B.

Thus, the method 400 enables formation of articles of manufacture, such as the object 102, that have improved mechanical properties relative to articles formed without regulating grain formation. For example, an article formed using the method 400 may have multiple substantially equiaxed layers in which grains do not extend between layers, grain boundaries are not aligned between layers, or both. The substantially equiaxed layers provide more isotropic mechanical properties as compared columnar layers in which many grains extend between multiple of the layers.

Figure 5:
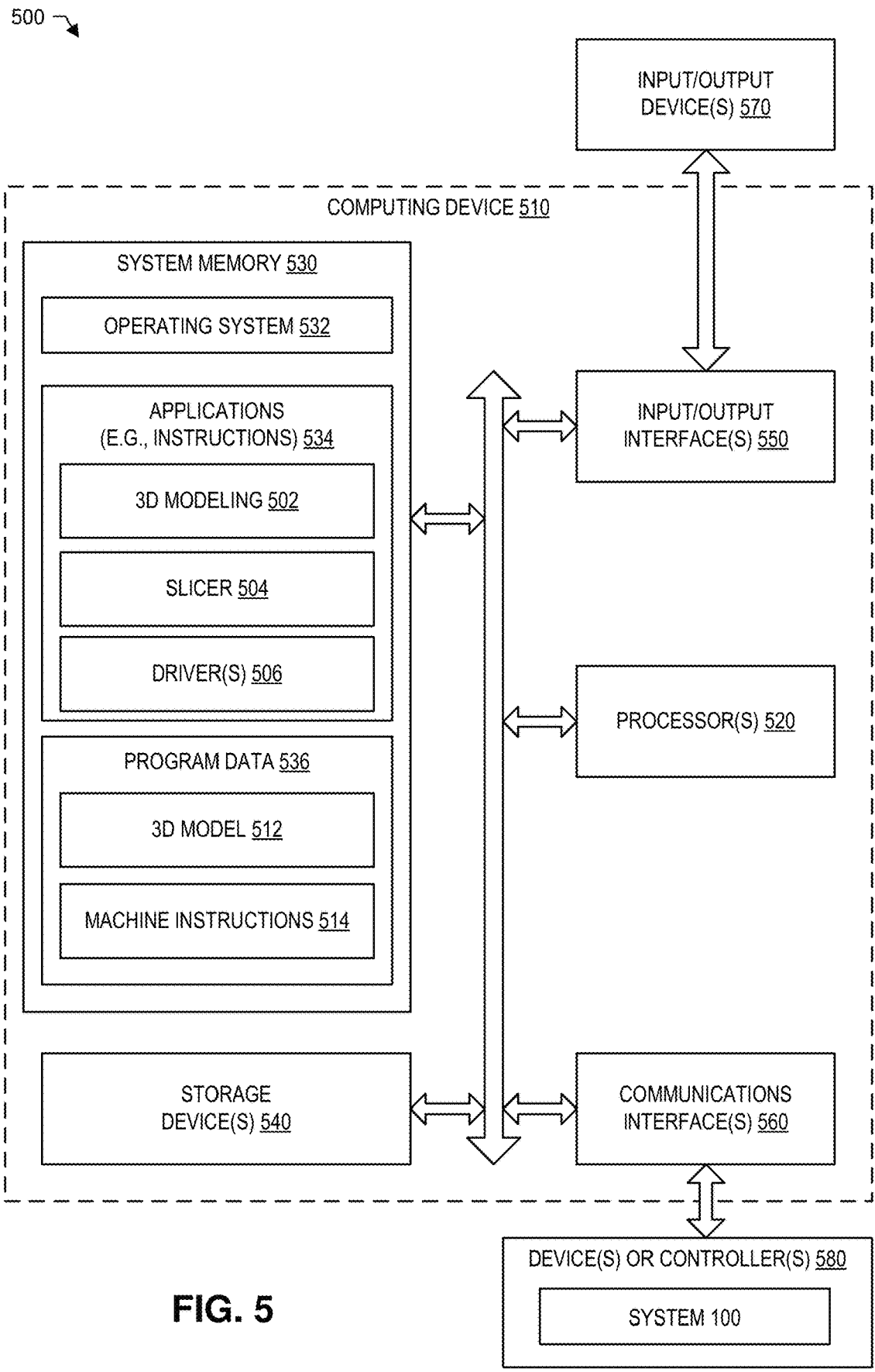
FIG. 5 is a block diagram of a computing environment including a computing device configured to support aspects of computer-implemented methods and computer-executable program instructions (or code) according to the present disclosure.

FIG. 5 is a block diagram of a computing environment 500 including a computing device 510 configured to support aspects of computer-implemented methods and computer-executable program instructions (or code) according to the present disclosure. For example, the computing device 510, or portions thereof, is configured to execute instructions to initiate, perform, or control one or more operations described with reference to FIGS. 1-4.

The computing device 510 includes one or more processors 520. The processor(s) 520 are configured to communicate with system memory 530, one or more storage devices 540, one or more input/output interfaces 550, one or more communications interfaces 560, or any combination thereof. The system memory 530 includes volatile memory devices (e.g., random access memory (RAM) devices), nonvolatile memory devices (e.g., read-only memory (ROM) devices, programmable read-only memory, and flash memory), or both. The system memory 530 stores an operating system 532, which may include a basic input/output system for booting the computing device 510 as well as a full operating system to enable the computing device 510 to interact with users, other programs, and other devices. The system memory 530 stores system (program) data 536, such as a 3D model 512 of the object 102, machine instructions 514 (such as G-code) to form the object 102, or a combination thereof.

The system memory 530 includes one or more applications 534 (e.g., sets of instructions) executable by the processor(s) 520. As an example, the one or more applications 534 include instructions executable by the processor(s) 520 to initiate, control, or perform one or more operations described with reference to FIGS. 1-4. To illustrate, the one or more applications 534 include instructions executable by the processor(s) 520 to initiate, control, or perform one or more operations described with reference to the controller 140 of FIG. 1. As an example, the applications 534 in FIG. 5 include 3D modeling instructions 502 to enable generation of a 3D model of the object 102, slicer instructions 504 to generate slices (e.g., computer model representing the layers 106) of the object 102, driver instructions 506 to generate machine instructions (e.g., G-code) to form the object 102, or a combination thereof.

In a particular implementation, the system memory 530 includes a non-transitory, computer readable medium storing the instructions that, when executed by the processor(s) 520, cause the processor(s) 520 to initiate, perform, or control operations to for the object 102. The operations include, for example, causing a first heat source to heat a feed material to form a melt pool of the feed material on a surface; causing a second heat source to heat the melt pool on the surface to regulate grain formation of the feed material as the melt pool cools and solidifies on the surface to form at least a portion of the object; and causing the first heat source and the second heat source to move relative to the surface as the melt pool is formed and cooled.

The one or more storage devices 540 include nonvolatile storage devices, such as magnetic disks, optical disks, or flash memory devices. In a particular example, the storage devices 540 include both removable and non-removable memory devices. The storage devices 540 are configured to store an operating system, images of operating systems, applications (e.g., one or more of the applications 534), and program data (e.g., the program data 536). In a particular aspect, the system memory 530, the storage devices 540, or both, include tangible computer-readable media. In a particular aspect, one or more of the storage devices 540 are external to the computing device 510.

The one or more input/output interfaces 550 that enable the computing device 510 to communicate with one or more input/output devices 570 to facilitate user interaction. For example, the one or more input/output interfaces 550 can include a display interface, an input interface, or both. For example, the input/output interface 550 is adapted to receive input from a user, to receive input from another computing device, or a combination thereof. In some implementations, the input/output interface 550 conforms to one or more standard interface protocols, including serial interfaces (e.g., universal serial bus (USB) interfaces or Institute of Electrical and Electronics Engineers (IEEE) interface standards), parallel interfaces, display adapters, audio adapters, or custom interfaces ("IEEE" is a registered trademark of The Institute of Electrical and Electronics Engineers, Inc. of Piscataway, New Jersey). In some implementations, the input/output device 570 includes one or more user interface devices and displays, including some combination of buttons, keyboards, pointing devices, displays, speakers, microphones, touch screens, and other devices.

The processor(s) 520 are configured to communicate with devices or controllers 580 via the one or more communications interfaces 560. For example, the one or more communications interfaces 560 can include a network interface. The devices or controllers 580 can include, for example, the system 100 of FIG. 1 or one or more components thereof.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-4. In some implementations, part or all of one or more of the operations or methods of FIGS. 1-4 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Figure 6:
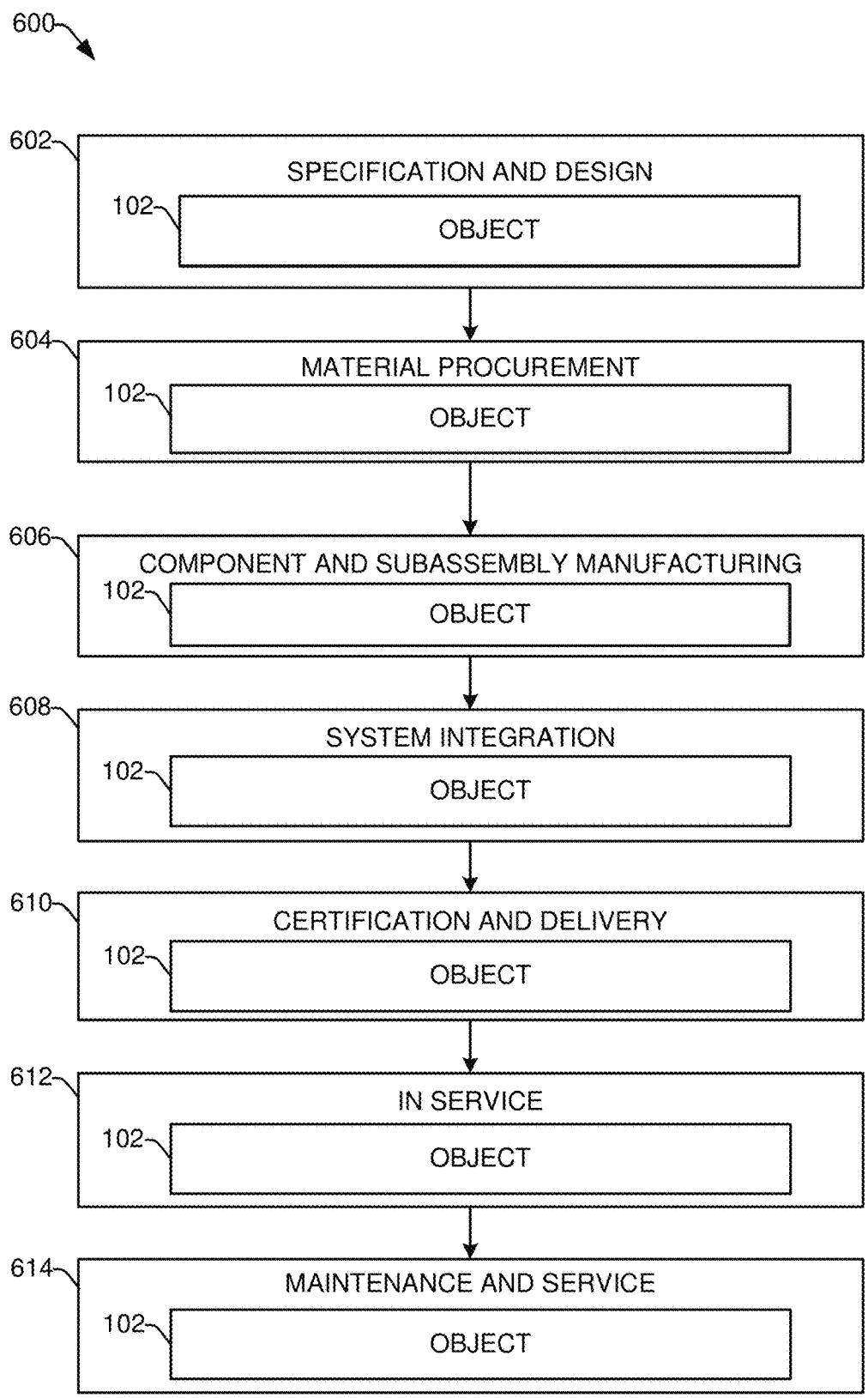
FIG. 6 illustrates a life cycle of the aircraft of FIG. 1 according to a particular implementation

FIG. 6 is a flowchart illustrating a life cycle of an aircraft that includes the object 102 of FIG. 1 or another article of manufacture formed using the method 400 of FIG. 4. During pre-production, the exemplary life cycle 600 includes, at block 602, specification and design of an aircraft, such as aircraft 700 of FIG. 7. During specification and design of the aircraft, the life cycle 600 may include specification and design of the object 102. At block 604, the life cycle 600 includes material procurement, which may include procuring materials for the object 102, such as the feed material 110 or one or more components of the system 100.

During production, the life cycle 600 includes, at block 606, component and subassembly manufacturing and, at block 608, system integration of the aircraft. For example, the life cycle 600 may include component and subassembly manufacturing of the object 102 (e.g., using the method 400 of FIG. 4) and system integration of the object 102. At block 610, the life cycle 600 includes certification and delivery of the aircraft and, at block 612, placing the aircraft in service. Certification and delivery may include certification of the object 102 to place the object 102 in service. While in service by a customer, the aircraft may be scheduled for routine maintenance and service (which may also include modification, reconfiguration, refurbishment, and so on). At block 614, the life cycle 600 includes performing maintenance and service on the aircraft, which may include performing maintenance and service on the object 102.

Each of the processes of the life cycle 600 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 7:
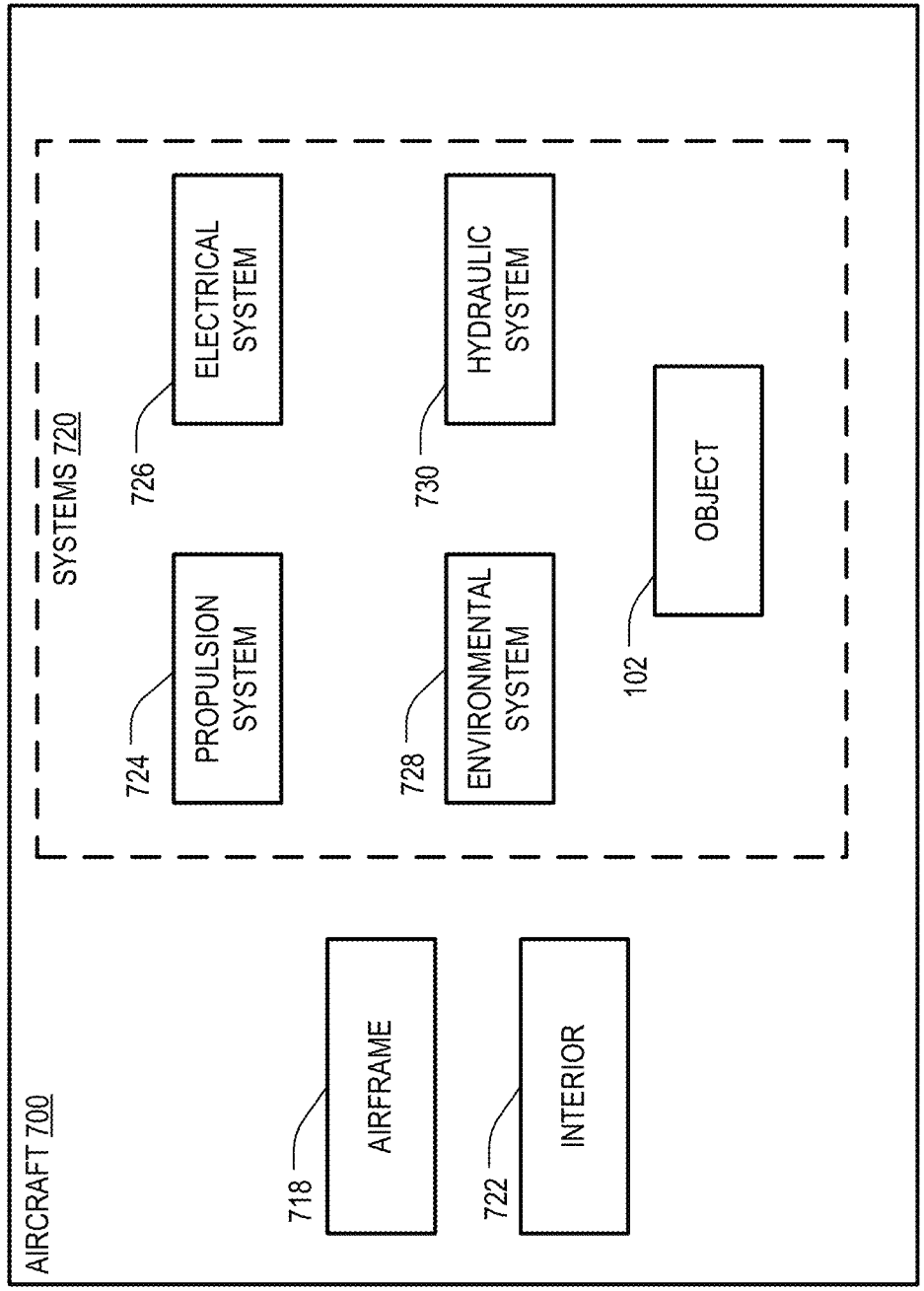
FIG. 7 is a block diagram that illustrates the aircraft of FIG. 1 according to a particular implementation.

Aspects of the disclosure can be described in the context of an example of a vehicle. In the example of FIG. 7, the vehicle is an aircraft 700 that includes an airframe 718 with an interior 722. The aircraft 700 also includes a plurality of systems 720. In the example illustrated in FIG. 7, the systems 720 include a propulsion system 724, an electrical system 726, an environmental system 728, and a hydraulic system 730. In FIG. 7, the aircraft 700 also includes the object 102.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method of fabricating an object, the method comprising:
   causing a first heat source to heat a feed material to form a melt pool of the feed material on a surface;
   causing a second heat source to heat the melt pool on the surface to regulate equiaxed grain formation of the feed material in the melt pool as the melt pool cools and solidifies on the surface to form at least a portion of the object, wherein the second heat source comprises a laser source that directs laser light toward a portion of the melt pool and heats the melt pool by varying a frequency, an intensity, or both, of the laser light to control equiaxed grain formation of the feed material in the melt pool; and
   causing relative motion as the melt pool is formed and cooled, wherein the relative motion includes movement of the first and second heat sources relative to the surface, includes movement of the surface relative to the first and second heat sources, or both.

2. The method of claim 1, further comprising after the melt pool solidifies, applying one or more additional layers of the feed material to at least the portion of the object, each of the one or more additional layers applied to limit cross-layer grain growth.

3. The method of claim 1, wherein the first heat source comprises a plasma torch and wherein causing the first heat source to heat the feed material comprises feeding a wire including the feed material into a heating region associated with the plasma torch.

4. The method of claim 1, wherein causing the second heat source to heat the melt pool further comprises pulsing the laser light to control equiaxed grain formation of the feed material in the melt pool.

5. The method of claim 1, wherein the feed material comprises a metal.

6. The method of claim 1, wherein the feed material comprises a titanium alloy.

7. The method of claim 1, wherein the feed material comprises a titanium α-β alloy.

8. The method of claim 1, wherein causing the relative motion comprises moving a print head that includes or is coupled to the first heat source, the second heat source, or both.

9. A system for fabrication of an object, the system comprising:
   a first heat source to heat a feed material to form a melt pool of the feed material on a surface;
   a second heat source to heat the melt pool on the surface to regulate equiaxed grain formation of the feed material in the melt pool as the melt pool cools and solidifies on the surface to form at least a portion of the object, wherein the second heat source comprises a laser source to direct a laser light toward a portion of the melt pool, and wherein the second heat source is configured to heat the melt pool by varying a frequency, an intensity, or both, of the laser light to control equiaxed grain formation of the feed material in the melt pool; and
   a movement system to cause relative motion as the melt pool is formed and cooled, wherein the relative motion includes movement of the first and second heat sources relative to the surface, includes movement of the surface relative to the first and second heat sources, or both.

10. The system of claim 9, further comprising a controller to provide control signals to the second heat source, the movement system, or both, to limit formation of grains that extend across multiple layers of the object.

11. The system of claim 9, wherein the first heat source comprises a plasma torch.

12. The system of claim 9, wherein the second heat source comprises a pulsed laser source.

13. The system of claim 9, wherein the feed material comprises a metal wire alloy.

14. The system of claim 9, wherein the feed material comprises a titanium alloy.

15. The system of claim 9, further comprising a feed system to supply the feed material to the first heat source.

16. The system of claim 9, wherein the feed material comprises a titanium α-β alloy.

17. The system of claim 16, wherein the feed material comprises Ti-6A1-4V.

18. The system of claim 9, wherein the movement system comprises a multi-axis table.

19. The system of claim 9, wherein the movement system is coupled to a print head, the print head coupled to the first heat source, the second heat source, or both.

20. The system of claim 9, wherein the movement system comprises a robotic arm.

* * * * *